US010908455B2

(12) United States Patent
Lim et al.

(10) Patent No.: US 10,908,455 B2
(45) Date of Patent: Feb. 2, 2021

(54) DISPLAY DEVICE

(71) Applicant: Samsung Display Co., Ltd., Yongin-Si (KR)

(72) Inventors: Taewoo Lim, Cheonan-si (KR); Dongwoo Kim, Seoul (KR); Minsu Kim, Hwaseong-si (KR); Cheonjae Maeng, Suwon-si (KR); Keunwoo Park, Incheon (KR); Seongyeon Lee, Asan-si (KR); Hongbeom Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/537,648

(22) Filed: Aug. 12, 2019

(65) Prior Publication Data
US 2020/0089054 A1 Mar. 19, 2020

(30) Foreign Application Priority Data
Sep. 18, 2018 (KR) .......... 10-2018-0111166

(51) Int. Cl.
G02F 1/13357 (2006.01)
(52) U.S. Cl.
CPC .. *G02F 1/133603* (2013.01); *G02F 1/133605* (2013.01); *G02F 1/133606* (2013.01);
(Continued)
(58) Field of Classification Search
CPC ......... G02F 1/133603; G02F 1/133605; G02F 1/133606; G02F 2001/133614; G02F 2001/133607
See application file for complete search history.

(56) References Cited

U.S. PATENT DOCUMENTS 9,366,398 B2 * 6/2016 Jang ................ G02F 1/133603
10,114,247 B2 10/2018 Lee
(Continued)

FOREIGN PATENT DOCUMENTS

EP 2840438 2/2015
EP 3299877 3/2018
(Continued)

OTHER PUBLICATIONS

Extended European Search Report dated Jan. 22, 2020, issued in EP Patent Application No. 19197175.3.

*Primary Examiner* — Tsion Tumebo
(74) *Attorney, Agent, or Firm* — H.C. Park & Associates, PLC

(57) ABSTRACT

A display device including an optical member, a display panel disposed above the optical member, and a plurality of light emitting units disposed below the optical member and configured to provide first color light to the optical member, in which the optical member includes a support substrate having upper and surfaces and overlapping the light emitting units, a quantum dot layer disposed on the support substrate and configured to convert the first color light into second color light and third color light, and a filter directly disposed on at least one of the upper surface and the lower surface of the support substrate, and having a first transmittance to the first color light having a first incident angle of 0 degrees and having a second transmittance greater than the first transmittance to the first color light having a second incident angle greater than the first incident angle.

23 Claims, 19 Drawing Sheets

(52) U.S. Cl.
CPC ............ *G02F 2001/133607* (2013.01); *G02F 2001/133614* (2013.01)

(56) References Cited

U.S. PATENT DOCUMENTS

| | | | |
|---|---|---|---|
| 10,330,850 B2 | 6/2019 | Kim et al. | |
| 10,401,552 B2 | 9/2019 | Kim et al. | |
| 2002/0054261 A1* | 5/2002 | Sekiguchi | G02F 1/13338 349/122 |
| 2007/0195240 A1* | 8/2007 | Han | G02F 1/133553 349/114 |
| 2009/0027594 A1* | 1/2009 | Yun | G02F 1/133514 349/64 |
| 2010/0059754 A1* | 3/2010 | Lee | H01L 27/322 257/59 |
| 2014/0009905 A1* | 1/2014 | Kobayashi | H01L 27/322 362/84 |
| 2015/0323711 A1* | 11/2015 | Bessho | G02B 5/0242 349/71 |
| 2018/0088266 A1 | 3/2018 | Kim et al. | |
| 2018/0237690 A1* | 8/2018 | Chung | G03F 7/162 |
| 2019/0265548 A1 | 8/2019 | Liu et al. | |

FOREIGN PATENT DOCUMENTS

| | | |
|---|---|---|
| EP | 3312665 | 4/2018 |
| KR | 10-2017-0014755 | 2/2017 |
| KR | 10-2018-0034741 | 4/2018 |
| KR | 10-1863277 | 5/2018 |
| KR | 10-2019-0118698 | 10/2019 |
| KR | 10-2020-0047872 | 5/2020 |
| WO | 2018160304 | 9/2018 |

\* cited by examiner

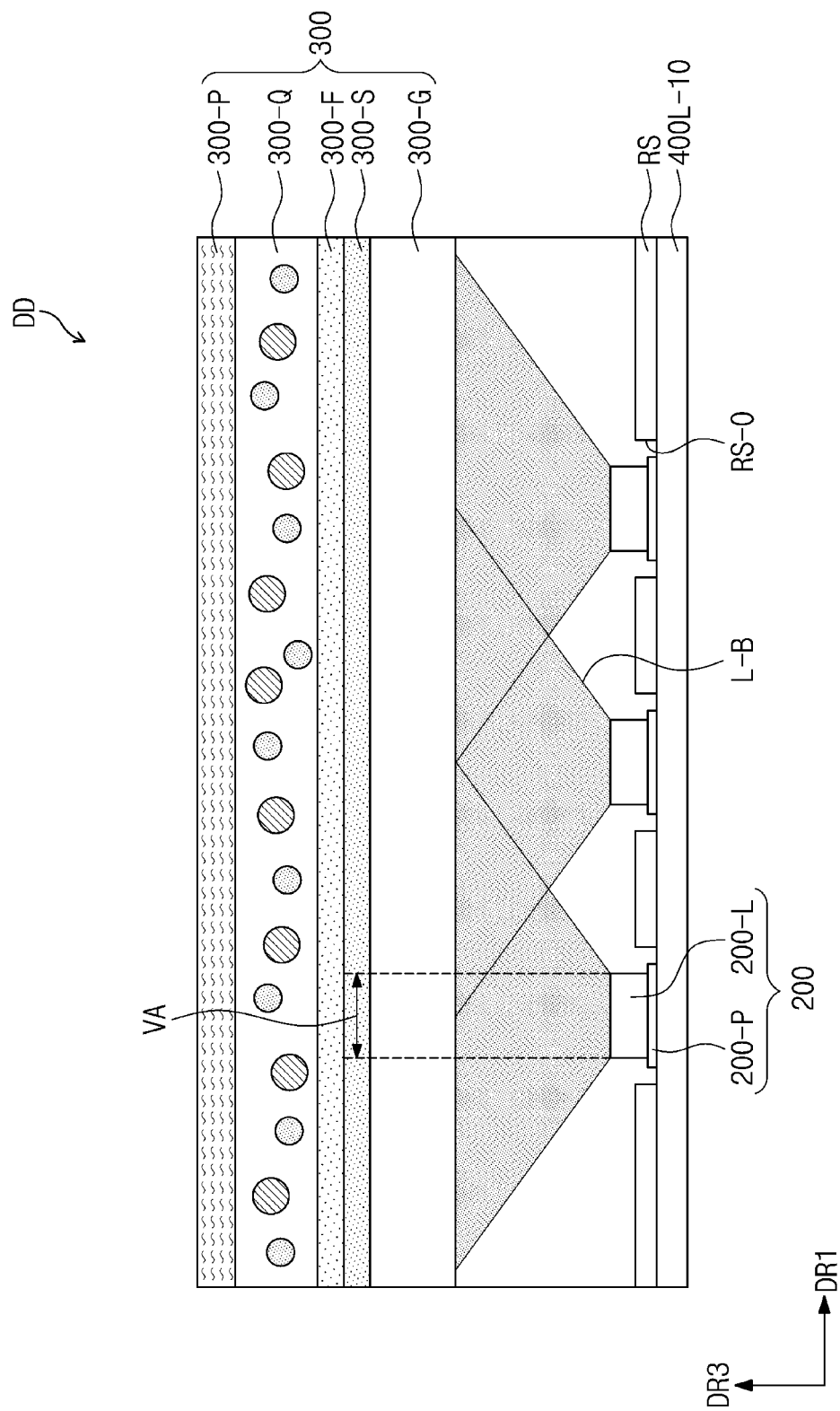

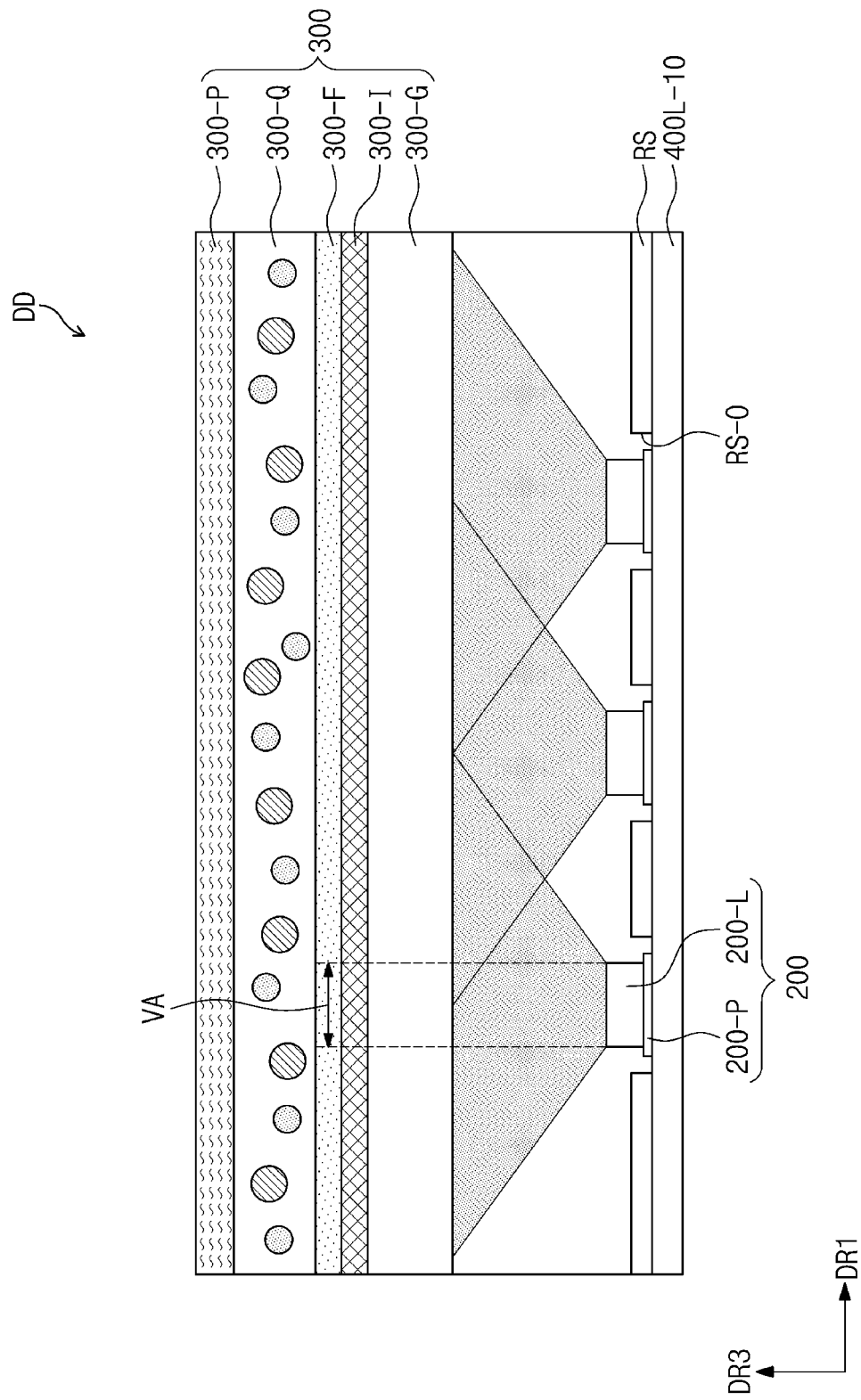

DISPLAY DEVICE

CROSS-REFERENCE TO RELATED APPLICATION

This application claims priority from and the benefit of Korean Patent Application No. 10-2018-0111166, filed on Sep. 18, 2018, which is hereby incorporated by reference for all purposes as if fully set forth herein.

BACKGROUND

Field

Exemplary embodiments of the invention relate generally to a display device and, more specifically, to a display device having an improved display quality.

Discussion of the Background

A non-emission type display device DD, such as a liquid crystal display device generates an image by using light provided from a backlight unit. The backlight unit includes a plurality of light emitting units emitting light. Each of the plurality of light emitting units includes a plurality of light emitting elements.

The non-emission type display device DD includes an optical member for improving characteristics of light provided from the light emitting units. The optical member is disposed below the display panel.

The above information disclosed in this Background section is only for understanding of the background of the inventive concepts, and, therefore, it may contain information that does not constitute prior art.

SUMMARY

Devices constructed according to exemplary embodiments of the invention are capable of preventing a hot spot phenomenon.

Additional features of the inventive concepts will be set forth in the description which follows, and in part will be apparent from the description, or may be learned by practice of the inventive concepts.

A display device according to an exemplary embodiment includes an optical member, a display panel disposed above the optical member, and a plurality of light emitting units disposed below the optical member and configured to provide first color light to the optical member, in which the optical member includes a support substrate having upper surface and lower surface facing each other in a thickness direction and overlapping the light emitting units, a quantum dot layer directly disposed on the upper surface or the lower surface and configured to convert the first color light into second color light and third color light, and a filter directly disposed on at least one of the upper surface and the lower surface of the support substrate, and having a first transmittance to the first color light having a first incident angle of 0 degrees and having a second transmittance greater than the first transmittance to the first color light having a second incident angle greater than the first incident angle.

The first transmittance may be about 10% to about 45%.

A value of the first transmittance to the first color light having the first incident angle may be less than a value of reflectance to the first color light having the first incident angle.

The first color light may have a wavelength of about 410 nm to about 480 nm.

The filter may include a plurality of first layers and a plurality of second layers alternatively disposed with each other, each of the first layers may have a refractive index of about 1.8 to about 2.0 in a wavelength of 450 nm and a thickness of about 160 nm to about 200 nm, and each of the second layers may have a refractive index of about 1.4 to about 1.5 in a wavelength of 450 nm and a thickness of about 60 nm to about 100 nm.

Each of the first layers may include silicon nitride, and each of the second layers may include silicon oxide.

A laminated number of the first layers and the second layers may be about 5 to about 20.

Each of the light emitting units may include a circuit board having a substantially elongated shape and a plurality of light emitting elements mounted on the circuit board.

The display device may further include a reflection sheet disposed on the circuit board, the reflection sheet having a plurality of openings that correspond to the light emitting elements, in which the reflection sheet has a blue color.

The filter may overlap a portion of the upper surface and the lower surface of the support substrate, the filter may include a plurality of filter patterns spaced apart from each other, and each of the filter patterns may correspond to a corresponding one of the light emitting elements in a plan view.

Each of the filter patterns may include a first portion overlapping the corresponding one of the light emitting elements, and a second portion having an area less than that of the first portion and does not overlap the corresponding one of the light emitting elements.

The display device may further include a compensation layer disposed adjacent to the filter patterns, the compensation layer not overlapping the filter patterns.

The filter may overlap a portion of each of the upper surface and the lower surface of the support substrate, and the filter may include openings in areas that do not overlap the light emitting elements.

The display device may further include a compensation pattern filled in the openings.

The display device may further include a scattering layer directly disposed on at least one of the upper surface and the lower surface of the support substrate, the scattering layer including a base resin layer and scattering particles mixed with the base resin layer.

Each of the scattering particles may include at least one of $TiO_2$, $SiO_2$, ZnO, $Al_2O_3$, $BaSO_4$, $CaCO3$, and $ZrO_2$.

The scattering particles may have a refractive index of at least 2 and a diameter of about 150 nm to about 400 nm.

The display device may further include an insulation layer contacting the upper surface of the support substrate and having a refractive index of about 1.3 or less.

The lower surface of the support substrate may include concave lens patterns.

The upper surface of the support substrate may include convex scattering patterns.

The display device may further include a passivation layer contacting the convex scattering patterns of the support substrate and providing a planarization surface.

The display device may further include a barrier layer contacting at least one of upper surface and lower surface of the quantum dot layer, and including an inorganic material.

The support substrate may be a glass substrate.

A display device according to another exemplary embodiment includes an optical member, a display panel disposed above the optical member, a plurality of light emitting units disposed below the optical member and configured to provide blue light to the optical member, and a protection member accommodating the light emitting units, the optical member, and the display panel, in which the optical member includes a glass substrate having an upper surface and a lower surface facing each other in a thickness direction and overlapping the light emitting units, a quantum dot layer directly disposed on the upper surface or the lower surface and configured to convert the blue color light into green light and red light, and a filter directly disposed on at least one of the upper surface and the lower surface of the glass substrate, in which the filter includes a plurality of first layers and a plurality of second layers alternatively disposed with the plurality of first layers, and each of the first layers has a refractive index of about 1.8 to about 2.0 in a wavelength of 450 nm and has a thickness of about 160 nm to about 200 nm, and each of the second layers has a refractive index of about 1.4 to about 1.5 in the wavelength of 450 nm has a thickness of about 60 nm to about 100 nm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 6A is a cross-sectional view of a portion of the display device according to an exemplary embodiment.

FIG. 7 is a cross-sectional view of a portion of a display device according to an exemplary embodiment.

DETAILED DESCRIPTION

Figure 1:
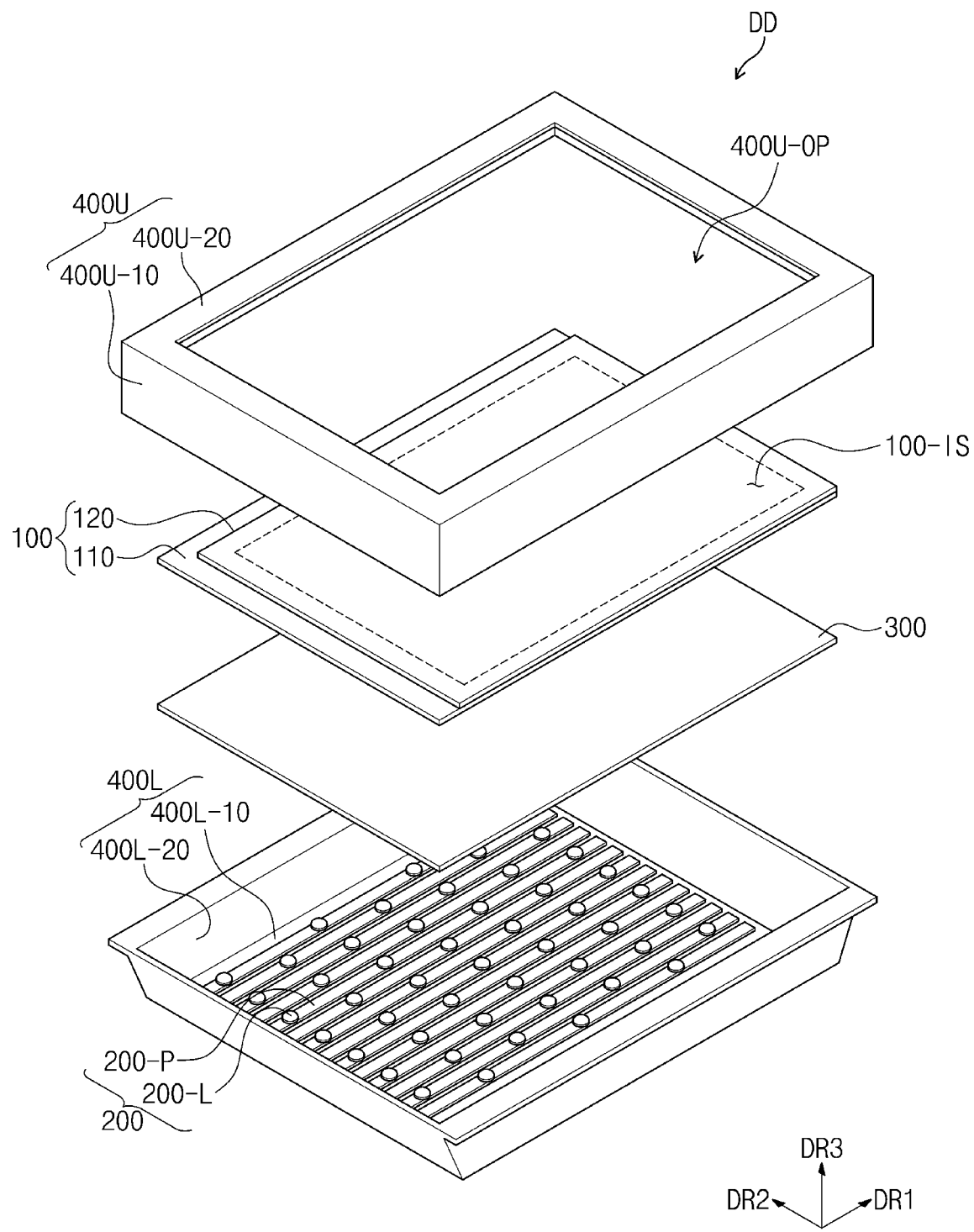
FIG. 1 is an exploded perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is an exploded perspective view of a display device DD according to an exemplary embodiment.

Referring to FIG. 1, the display device DD includes a display panel 100, light emitting units 200, an optical member 300, and protection members 400L and 400U.

The display panel 100 receives light from the light emitting units 200 to display an image. The display panel 100 is not specifically limited. For example, the display panel may include a transmissive or transflective display panel such as a crystal display panel, an electrophoretic display panel, an electrowetting display panel, and the like.

The display panel 100 may display an image through a display surface 100-IS. The display surface 100-IS is substantially parallel to a surface defined by a first directional axis DR1 and a second directional axis DR2. A normal direction of the display surface 100-IS, e.g., a thickness direction of the display panel 100, is indicated as a third directional axis DR3.

A front surface (or a upper surface) and a rear surface (or a bottom surface) of each of members or units, which will be described below, may be distinguished by the third directional axis DR3. However, the first to third directional axes illustrated herein may be exemplary, and may be varied in some exemplary embodiments. Hereinafter, first to third directions may be directions indicated by the first to third directional axes DR1, DR2, and DR3 and designated by the same reference numerals, respectively.

Although FIG. 1 shows the display panel 100 being flat, however, the inventive concepts are not limited thereto. For example, the display panel 100 in some exemplary embodiments may be a curved display panel having a curved display surface. The display panel 100 is not particularly limited in shape.

In the illustrated exemplary embodiment, the liquid crystal display panel will be described as the display panel 100. The liquid crystal display panel includes a first substrate 110, a second substrate 120 facing the first substrate 110, and a liquid crystal layer disposed between the first substrate 110 and the second substrate 120. The liquid display panel may be divided into a display area and an edge area surrounding the display area. The display area may be an area on which the image is displayed, and the edge area may be an area adjacent to the display area and may not display an image. The liquid crystal display panel includes a plurality of pixels disposed on the display area. In an exemplary embodiment, the display device may further include a pair of polarizers.

A signal line and a pixel circuit of the pixels are disposed on one of the first substrate 110 (hereinafter, referred to as an "array substrate") and the second substrate 120. The array substrate may be connected to a main circuit board through a chip on film (COF) manner. A central control circuit for driving the display panel 100 is disposed on the main circuit board. The central control circuit may be a microprocessor, and the COF may be a data driving circuit, for example. The gate driving circuit may be mounted on the array substrate and integrated with the array substrate in the form of a low temperature poly-silicon (LTPS).

The control circuit may control the light emitting units 200. The control circuit may transmit a dimming signal for controlling the light emitting units 200 to the light emitting units 200.

The light emitting units 200 are disposed below the display panel 100 and the optical member 300. The light emitting units 200 may generate a first color light. The first color light may have a wavelength of about 410 nm to about 480 nm. The first color light may have a peak wavelength of about 440 nm to about 460 nm. The first color light may be generally blue.

Each of the light emitting units 200 includes a plurality of light emitting elements 200-L, which are provided as point light sources, and a circuit board 200-P providing an electrical signal to the light emitting elements 200-L. Each of the plurality of light emitting elements 200-L may be provided as a light emitting diode. The light emitting units 200 may each include different numbers of light emitting elements 200-L therein.

The display device DD may further include a circuit board electrically connecting the light emitting units 200 to each other. A dimming circuit may be disposed on the circuit board. The dimming circuit may dim the light emitting units 200 according to the control signal received from the central control circuit. The plurality of light emitting elements 200-L may be turned off at the same time or individually.

The optical member 300 may be disposed below the display panel 100 and above the light emitting units 200. The optical member 300 receives the first color light from the light emitting units 200. The optical member 300 may transmit a portion of the first color light and convert the first color light into a second color light and a third color light.

The second color light may have a wavelength of about 500 nm to about 570 nm. The third color light may have a wavelength of about 580 nm to about 675 nm. The second color light may have a peak wavelength of about 515 nm to about 545 nm. The second color light may be substantially green. The third color light may have a peak wavelength of about 610 nm to about 645 nm. The third color light may be substantially red.

The protection members 400L and 400U include a first protection member 400L disposed below the light emitting units 200 and a second protection member 400U disposed above the display panel 100. The first protection member 400L and the second protection member 400U may be coupled to each other to accommodate the display panel 100, the light emitting units 200, and the optical member 300. Each of the first protection member 400L and the second protection member 400U may be made of a metal or plastic. The protection members 400L and 400U may further include a mold member.

The first protection member 400L accommodates the light emitting units 200. The first protection member 400L includes a bottom part 400L-10 and a plurality of sidewall parts 400L-20 bent and extending from edges of the bottom part 400L-10. The bottom part 400L-10 may have a substantially rectangular shape, and the first protection member 400L may include four sidewall parts 400L-20. However, the first protection member 400 is not specifically limited in shape. The number of sidewall parts 400L-20 may vary, and stepped portions may be disposed on the bottom part 400L-10 and the sidewall parts 400L-20.

The light emitting units 200 may be mounted on the bottom part 400L-10. The light emitting units 200, e.g., the circuit boards 200-P may substantially cover the entire bottom part 400L-10. For example, the circuit boards 200-P may cover about 90% or more of the bottom part 400L-10.

The second protection member 400U may be disposed above the display panel 100 to cover an edge area of the display panel 100. An opening 400U-OP, through which an image may be shown, may be defined in the second protection member 400U. The opening 400U-OP may correspond the display area of the display panel 100.

The second protection member 400U may be a frame having a substantially rectangular shape. The second protection member 400U may be divided into four sections. The four sections may have an integrated shape or be assembled with each other. Each of the four sections includes a sidewall part 400U-10 and a front surface part 400U-20 bent from the sidewall part 400U-10. An opening 400U-OP may be substantially defined by the front surface parts 400U-20 of the four sections. In an exemplary embodiment, the front surface part 400U-20 may be omitted.

Figure 2A:
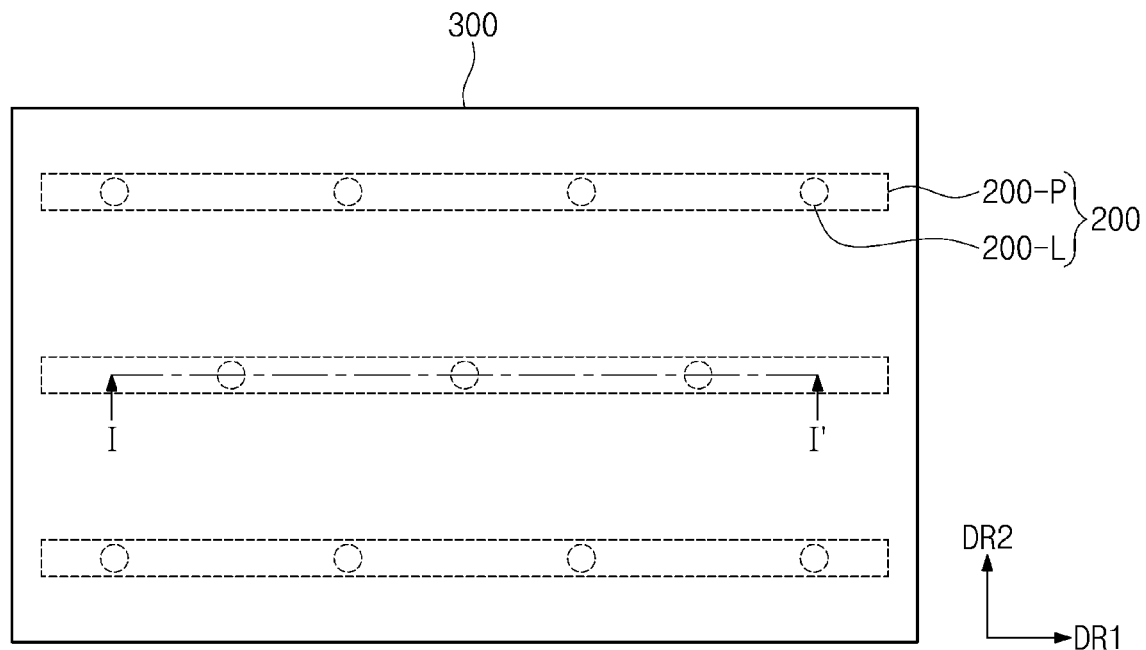
FIG. 2A is a plan view of a portion of the display device according to an exemplary embodiment.
Figure 2B:
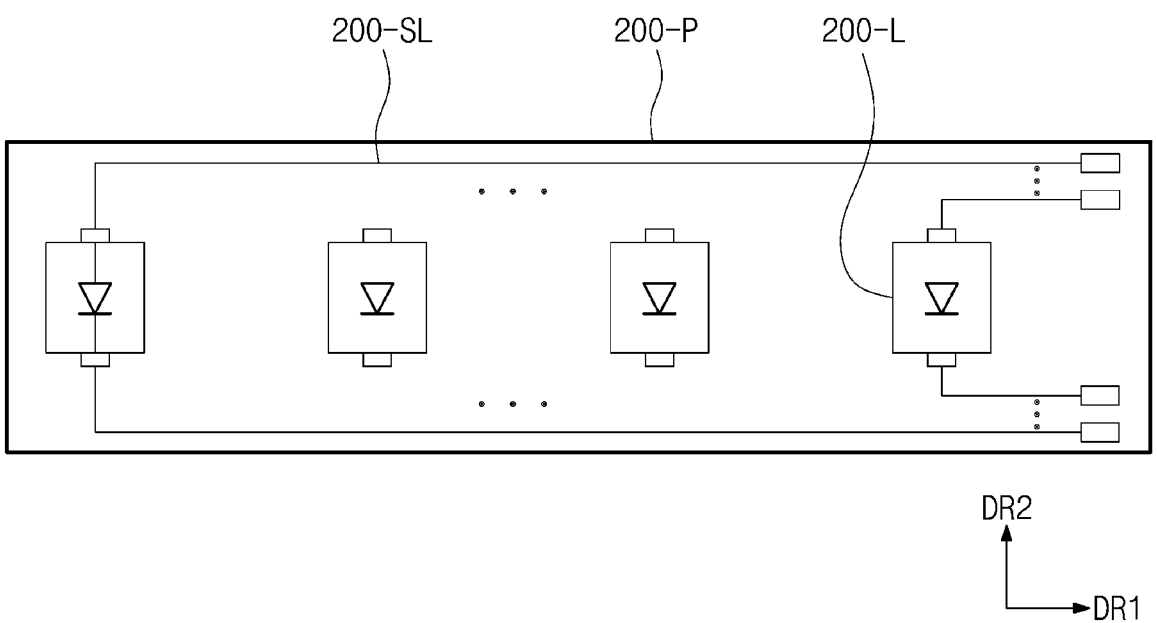
FIG. 2B is an equivalent circuit diagram of a light emitting unit according to an exemplary embodiment.
Figure 2C:
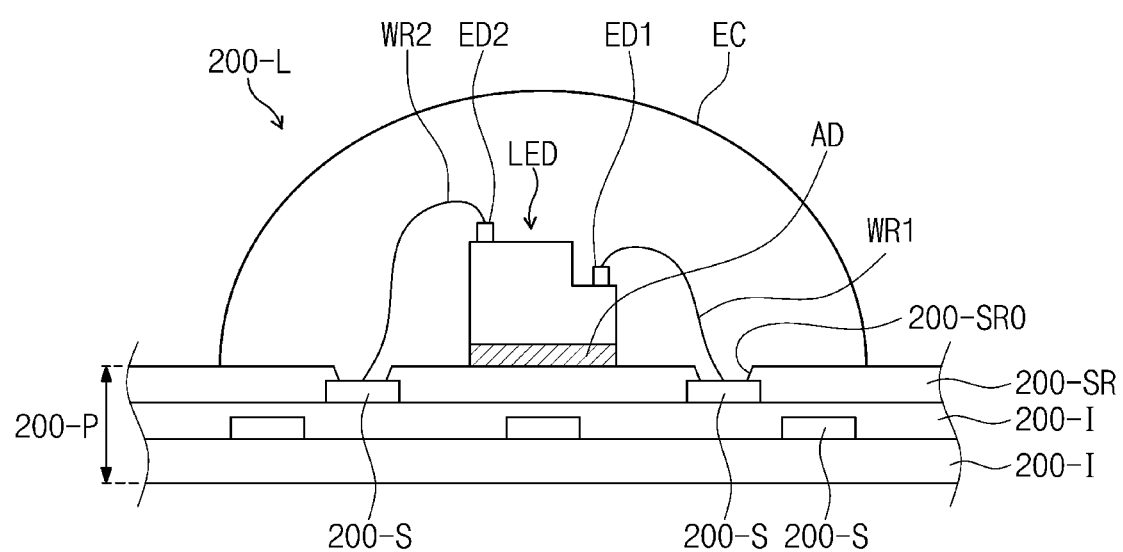
FIG. 2C is a cross-sectional view of the light emitting unit according to an exemplary embodiment.
Figure 2D:
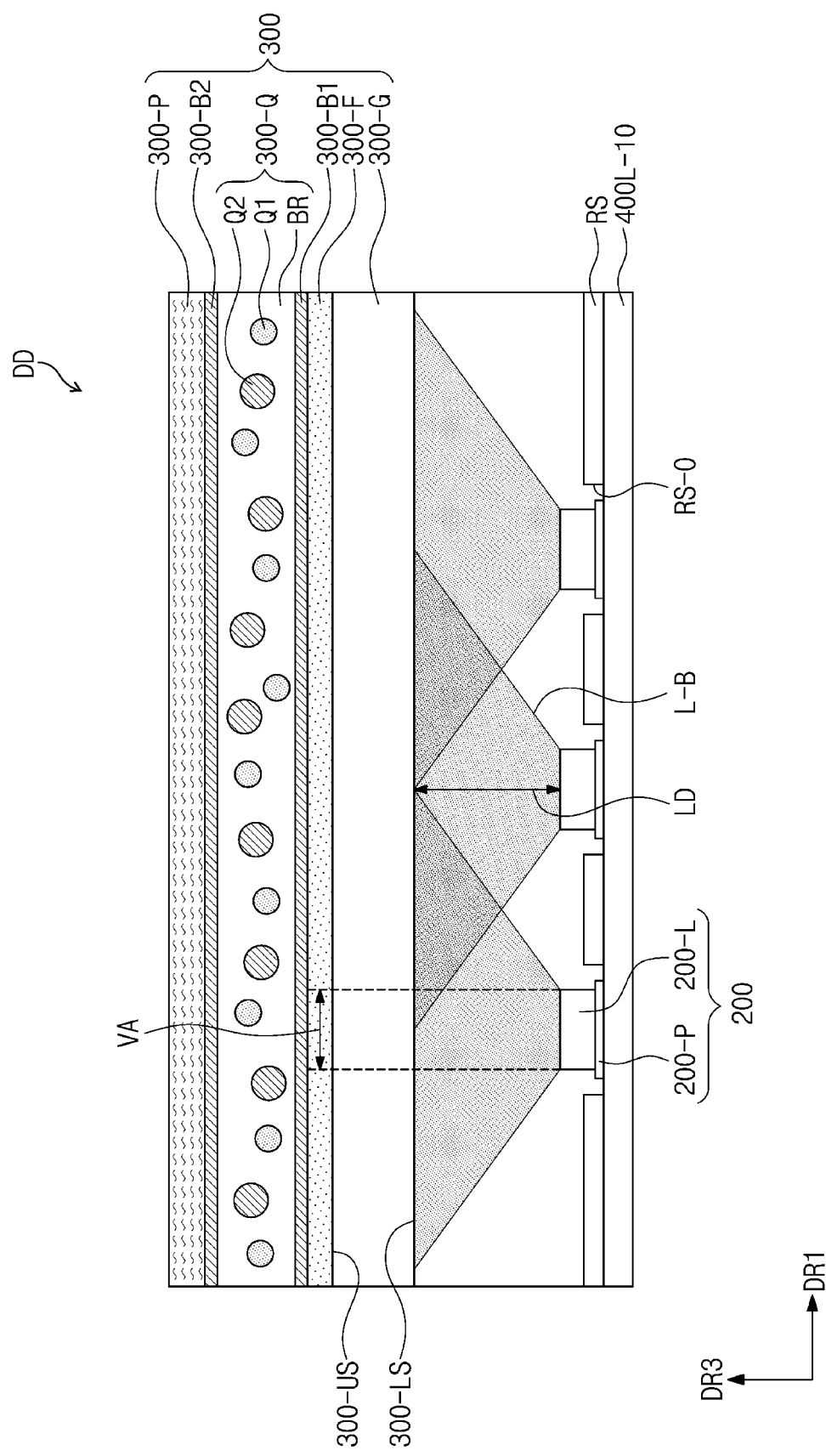
FIG. 2D is a cross-sectional view of a portion of the display device according to an exemplary embodiment.

FIG. 2A is a plan view illustrating a portion of the display device DD according to an exemplary embodiment. FIG. 2B is an equivalent circuit diagram of a light emitting unit 200 according to an exemplary embodiment. FIG. 2C is a cross-sectional view of the light emitting unit 200 according to an exemplary embodiment. FIG. 2D is a cross-sectional view illustrating a portion of the display device DD according to an exemplary embodiment.

Referring to FIGS. 2A to 2C, each of the light emitting units 200 include light emitting elements 200-L and circuit boards 200-P. In FIG. 2, a portion of the light emitting units 200 is not shown. As illustrated in FIG. 2B, the light emitting elements 200L are respectively connected to signal lines 200-SL so as to be dimmable.

As illustrated in FIGS. 2A and 2B, each of the circuit boards 200-P has a shape substantially extending in the first direction DR1. As illustrated in FIG. 2C, the circuit board 200-P includes at least one insulation layer 200-I and at least one circuit layer 200-S. FIG. 2C shows a multilayer circuit board 200-P according to an exemplary embodiment, in which two insulation layers 200-I and two circuit layers 200-S are alternately laminated. The circuit layers 200-S may include a plurality of conductive patterns. The conductive patterns may include the signal line 200-SL of FIG. 2C.

The uppermost circuit layer 200-S of the two circuit layers 200-S is covered by a protection layer 200-SR. The protection layer 200-SR provides an outer surface of the circuit board 200-P. The uppermost circuit layer 200-S includes connection terminals connected to the signal line 200-SL. The protection layer 200-SR includes openings 200-SRO exposing the connection terminals.

Each of the light emitting elements 200-L may include a light emitting diode LED. The light emitting diode LED generates light in response to a driving voltage applied through the first electrode ED1 and a second electrode ED2. The light emitting diode LED may have a structure in which an n-type semiconductor layer, an active layer, and a p-type semiconductor layer are sequentially laminated.

The first electrode ED1 is connected to one of the connection terminals, and the second electrode ED2 is connected to the other of the connection terminals. The first electrode ED1 and the second electrode ED2 may be connected to the connection terminals by wires WR1 and WR2, respectively. The light emitting diode LED may be attached to the protection layer 200-SR by an adhesion member AD.

Each of the light emitting elements 200-L may further include an encapsulation member EC protecting the light emitting diode LED. The encapsulation member EC may prevent the wires WR1 and WR2 from being short-circuited or oxidized. The encapsulation member EC may include a resin material, such as an epoxy resin.

As illustrated in FIG. 2D, an optical member 300 includes a support substrate 300-G, a quantum dot layer 300-Q, barrier layers 300-B1 and 300-B2, a protection layer 300-P, and a filter 300-F. A laminated order of the support substrate 300-G, the quantum dot layer 300-Q, the barrier layers 300-B1 and 300-B2, the protection layer 300-P, and the filter 300-F shown in FIG. 2D is merely exemplary, and the laminated order thereof may be various modified in other exemplary embodiments.

The support substrate 300-G supports functional layers of the optical member 300. The support substrate 300-G may be a glass substrate, for example. However, the inventive concepts are not limited thereto, and the support substrate 300-G may be a transparent and heat-resistant synthetic resin substrate in some exemplary embodiments.

The glass substrate may have a thickness of about 0.3 mm to about 2 mm. Since the glass substrate 300-G has less thermal deformation, even though an optical distance LD between each of the light emitting elements 200-L and the glass substrate 300-G is short, defects may not occur. The optical distance LD may be about 3 mm to about 10 mm.

In the illustrated exemplary embodiment, the quantum dot layer 300-Q is directly disposed on a upper surface 300-US of the glass substrate 300-G. As used herein, an element A being "directly disposed" on element B may refer to that an adhesion layer is not disposed between the elements A and B, and elements A and B may or may not contact each other. In the illustrated exemplary embodiment, the quantum dot layer 300-Q is not formed by attaching a separate sheet, but is formed on the glass substrate 300-G.

The quantum dot layer 300-Q may include a base resin BR and quantum dots Q1 and Q2 that are mixed (or dispersed) in the base resin BR. The base resin BR may be a medium in which the quantum dots Q1 and Q2 are dispersed. In general, the base resin BR may include various resin compositions or binders. However, the inventive concepts are not limited thereto. As used herein, a medium capable of dispersing the quantum dots Q1 and Q2 may be called the base resin BR, regardless of its name, additional other functions, constituent materials, and the like. The base resin BR may be a polymer resin. For example, the base resin BR may include an acrylic-based resin, a urethane-based resin, and a silicon-based resin, and an epoxy-based resin. The base resin BR may be a transparent.

The quantum dots Q1 and Q2 may be particles that convert a wavelength of light provided from a light source member. Each of the quantum dots Q1 and Q2 may be a material having a crystal structure that has a size of several nanometers. The quantum dot may be composed of hundreds to thousands of atoms to provide a quantum confinement effect, in which an energy band gas increases due to the small size. When light having a wavelength with energy greater than that of a band gap is incident into the quantum dots Q1 and Q2, the quantum dots Q1 and Q2 may absorb light and become in an excited state to emit light having a specific wavelength, and thereafter becoming to a ground state. The emitted light has a value corresponding to the band gap. When the quantum dots Q1 and Q2 are adjusted in size and composition, a light emitting characteristic due to the quantum confinement effect may be adjusted.

Each of the quantum dots Q1 and Q2 may be selected from Group II-VI compounds, Group III-V compounds, Group IV-VI compounds, Group IV elements, Group IV compounds, and a combination thereof.

The Group II-VI compounds may be selected from binary element compounds selected from the group consisting of CdSe, CdTe, ZnS, ZnSe, ZnTe, ZnO, HgS, HgSe, HgTe, MgSe, MgS, and a combination thereof, ternary element compounds selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof, and quaternary element compounds selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compounds may be selected from binary element compounds selected from the group consisting of GaN, GaP, GaAs, GaSb, AlN, AlP, AlAs, AlSb, InN, InP, InAs, InSb, and a combination thereof, ternary element compounds selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof, and quaternary element compounds selected form the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof. The Group IV-VI compounds may be selected from binary element compounds selected from the group consisting of SnS, SnSe, SnTe, PbS, PbSe, PbTe, and a combination thereof, ternary element compounds selected from the group consisting of SnSeS, SnSeTe, SnSTe, PbSeS, PbSeTe, PbSTe, SnPbS, SnPbSe, SnPbTe, and a combination thereof, and quaternary element compounds selected form the group consisting of SnPbSSe, SnPbSeTe, SnPbSTe, and a combination thereof. The Group IV elements may be selected from the group consisting of Si, Ge, and a combination thereof. The Group IV compounds may be binary element compounds selected from the group consisting of SiC, SiGe, and a combination thereof.

The binary element compounds, the ternary element compounds, and the quaternary element compounds may exist in the particle at a uniform concentration or exist in the particle in which concentration distributions thereof are divided into partially different states.

Each of the quantum dots Q1 and Q2 may have a core shell structure including a core and a shell surrounding the core. Alternatively, the quantum dot may have a core/shell structure in which one quantum dot surrounds the other quantum dot. An interface between the core and the shell may have a concentration gradient, in which an element existing in the shell has a concentration that gradually decreases toward a center.

Each of the quantum dots Q1 and Q2 may have particles each having a size of a nano scale. Each of the quantum dots Q1 and Q2 may have a full width of half maximum (FWHM) of an emission wavelength spectrum of about 45 nm or less, preferably about 40 nm or less, more preferably about 30 nm or less. In this range, color purity and color reproducibility may be improved. Also, light emitted through the quantum dots Q1 and Q2 may be emitted in all directions to improve an optical viewing angle.

Also, each of the quantum dots Q1 and Q2 has a shape that is generally used in the art and is not specifically limited. In some exemplary embodiments, the quantum dot may have a spherical shape, a pyramidal shape, a multi-arm shape, a cubic nanoparticle shape, a nanotube shape, a nanowire shape, a nanofiber shape, a nanoplate particle shape, or the like.

In an exemplary embodiment, the quantum dot layer 300-Q may include a plurality of quantum dots Q1 and Q2 that covert the incident light into light having wavelengths different from each other. The plurality of quantum dots Q1 and Q2 may include first quantum dots Q1 that covert first color light L-B into second color light, and second quantum dots Q2 that convert the first color light L-B into third color light. The first, second, and third color light emitted from the quantum dot layer 300-Q may be white light, which is provided to the display panel 100 (see FIG. 1).

The barrier layers 300-B1 and 300-B2 protect the quantum dot layer 300-Q against external moisture. In this exemplary embodiment, the two barrier layers 300-B1 and 300-B2 respectively disposed on upper surface and lower surface of the quantum dot layer 300-Q are illustrated as an example. Each of the barrier layers 300-B1 and 300-B2 may be an inorganic layer. Each of the barrier layers 300-B1 and 300-B2 may include silicon oxide, silicon nitride, and silicon oxynitride. In an exemplary embodiment, at least one of the two barrier layers 300-B1 and 300-B2 may be omitted.

The protection layer 300-P may be disposed on the quantum dot layer 300-Q and contact the upper barrier layer 300-B2. The protection layer 300-P may include an organic layer. In some exemplary embodiments, the protection layer 300-P may be omitted.

The filter 300-F transmits a portion of the first color light L-B and reflects a portion of the first color light L-B. The transmittance may vary according an incident angle of the first color light L-G. The filter 300-F reflects a portion of the first color light L-B incident into an area VA (hereinafter, referred to as a "vertical area") that is the closest to the light emitting element 200-L and has the same area as the light emitting element 200-L, to guide the reflected first color light L-B to a peripheral area of the vertical area VA. In this manner, a hot spot phenomenon on the vertical area VA may be prevented from occurring. The hot spot phenomenon is a phenomenon in which light is concentrated into only a portion of the area of the display panel, such as the portion that overlaps the light emitting element 200-L. The filter 300-F may also guide the first color light L-B incident into the vertical area VA to other areas, as well as the first color light L-B incident into a peripheral area of the vertical area VA.

According to the illustrated exemplary embodiment, the direct-type light emitting units 200 may provide the white light to the display panel 100 (see FIG. 1) by using the quantum dot layer 300-Q to realize an image having high luminance.

The display device DD according to an exemplary embodiment may further include a reflection sheet RS. The reflection sheet RS is disposed on the plurality of light emitting units 200, and has a plurality of openings RS-O corresponding to the light emitting elements 200-L formed therein.

The reflection sheet RS may have a blue color that reflects blue light. The reflection sheet RS may include a resin layer and a blue organic layer disposed on the resin layer. The organic layer may absorb green light and red light.

A portion of the first color light L-B generated from the light emitting element 200-L and reflected by the optical member 300 may be reflected again by the blue reflection sheet RS, and be incident again into the optical member 300 to improve light efficiency.

The second color light and the third color light, which are generated from the optical member 300 to travel to the reflection sheet RS may be absorbed into the reflection sheet RS. In this manner, an amount of reflected light incident into the area corresponding to the turned-off light emitting element 200-L may be reduced in the dimming of the light emitting elements 200-L. Thus, the display device DD may have a larger contrast ratio.

In some exemplary embodiments, the reflection sheet RS of FIG. 2D may be omitted. In an exemplary embodiment, the protection layer 200-SR described with reference to FIG. 2C may have a blue color. The protection layer 200-SR may have substantially the same function as the reflection sheet RS. The circuit boards 200-P may substantially cover the bottom part 400L-10 to increase light efficiency. An arrangement relationship between the circuit boards 200-P and the bottom part 400L-10 has been previously described with reference to FIG. 1.

Figure 3A:
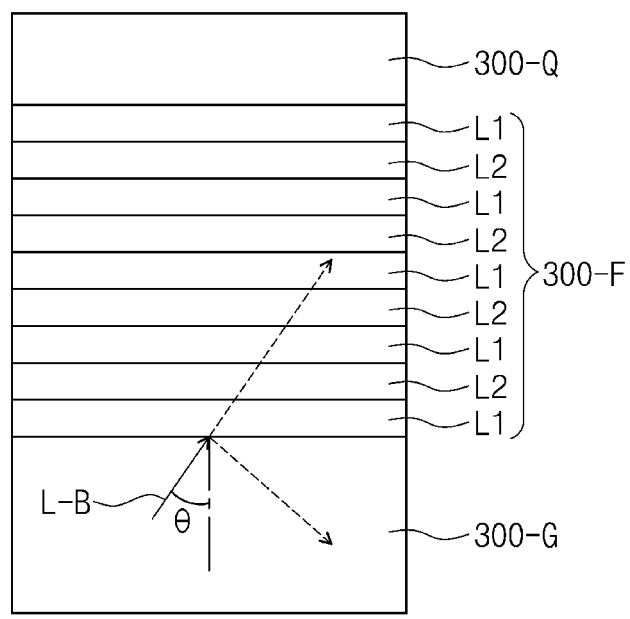
FIG. 3A is a cross-sectional view of a portion of a filter according to an exemplary embodiment.
Figure 3B:
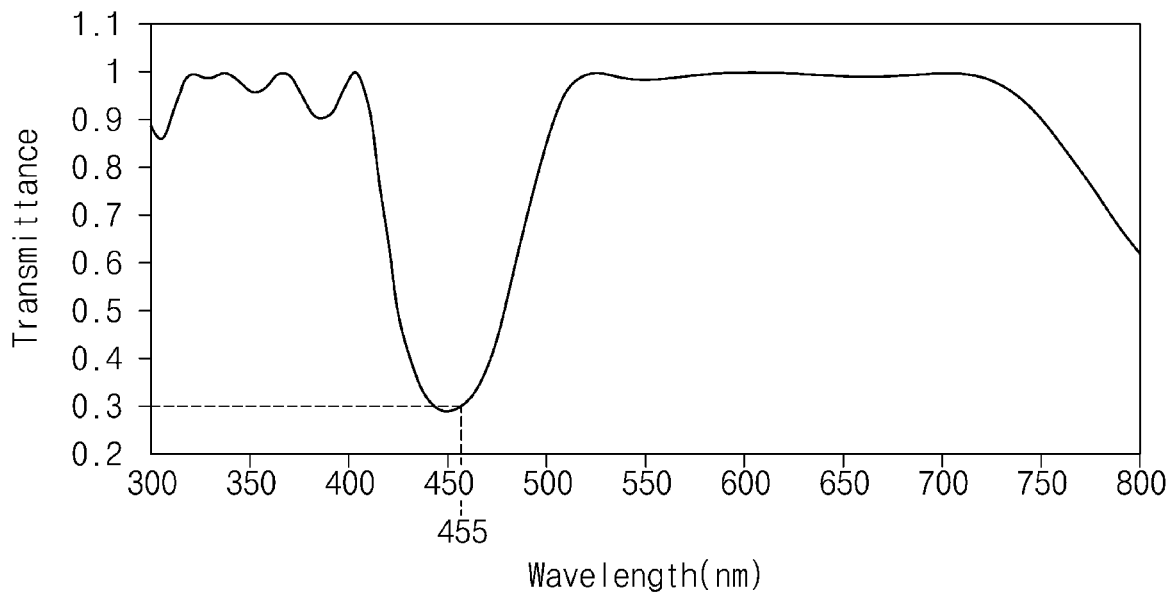
FIGS. 3B, 3C, 3D, and 3E are graphs illustrating transmittance depending on an incident angle of light incident into the filter according to an exemplary embodiment.
Figure 3C:
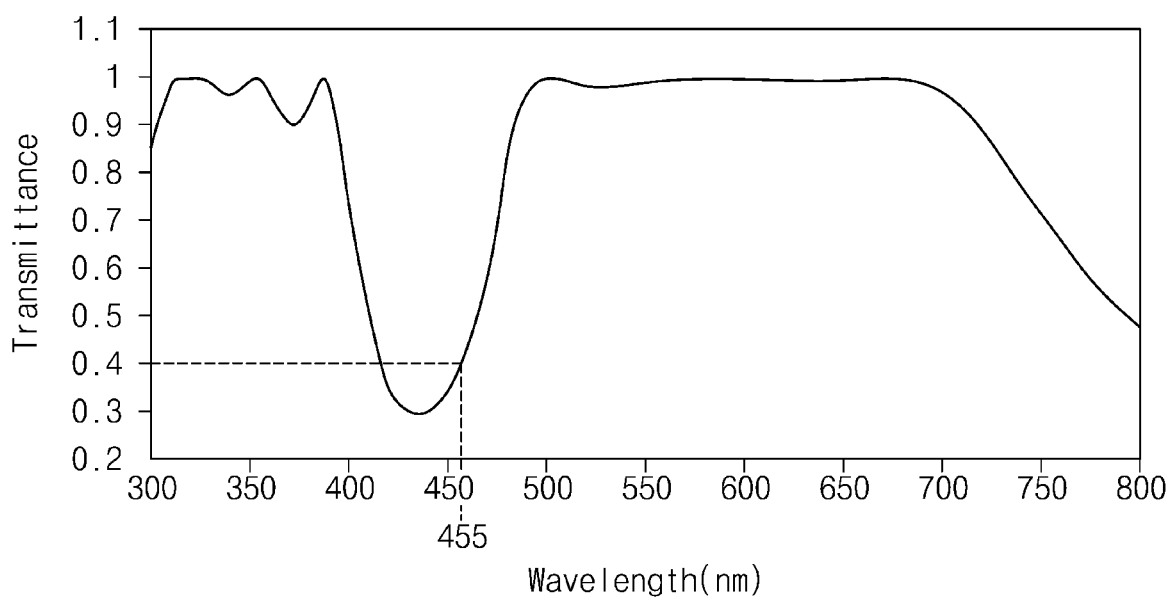
Figure 3D:
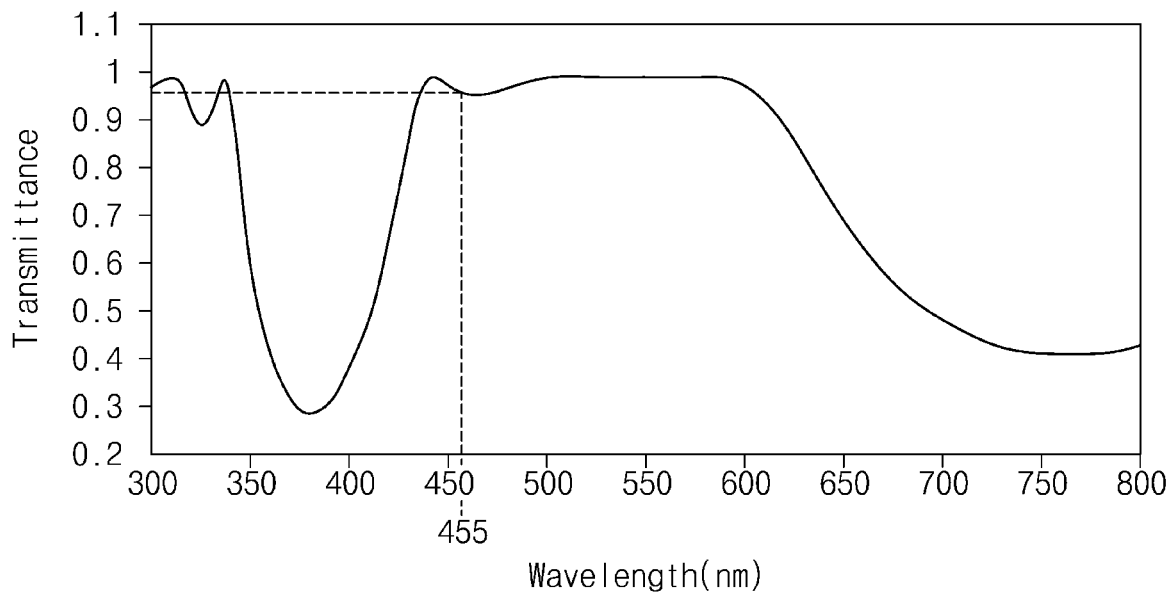
Figure 3E:
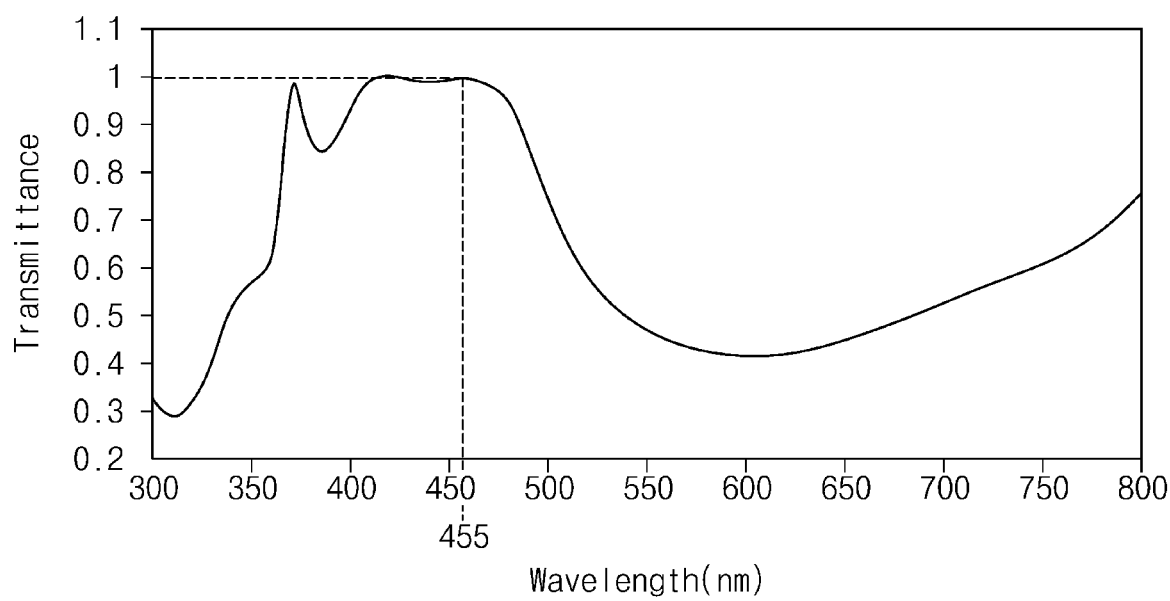
Figure 4A:
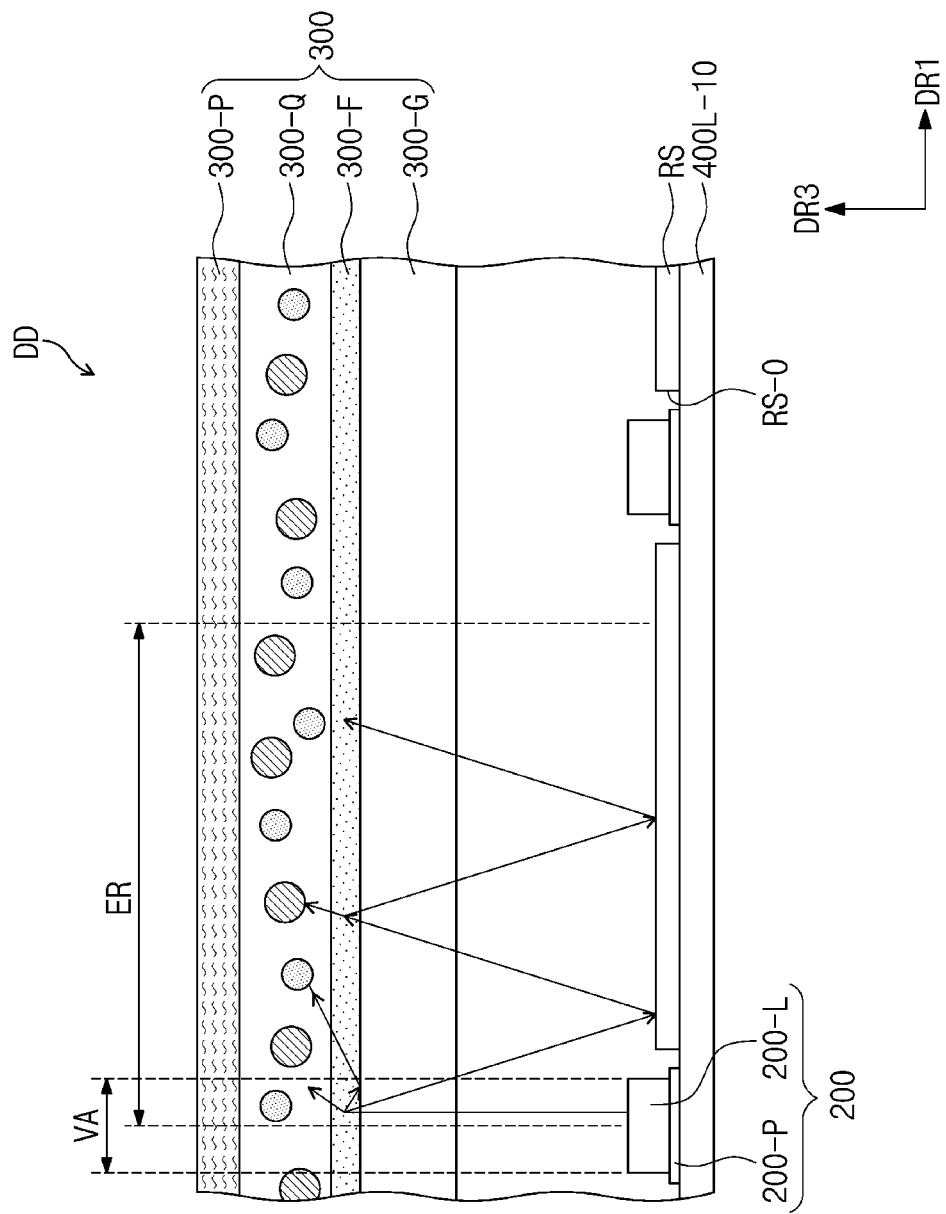
FIG. 4A is a cross-sectional view illustrating an operation of the filter according to an exemplary embodiment.
Figure 4B:
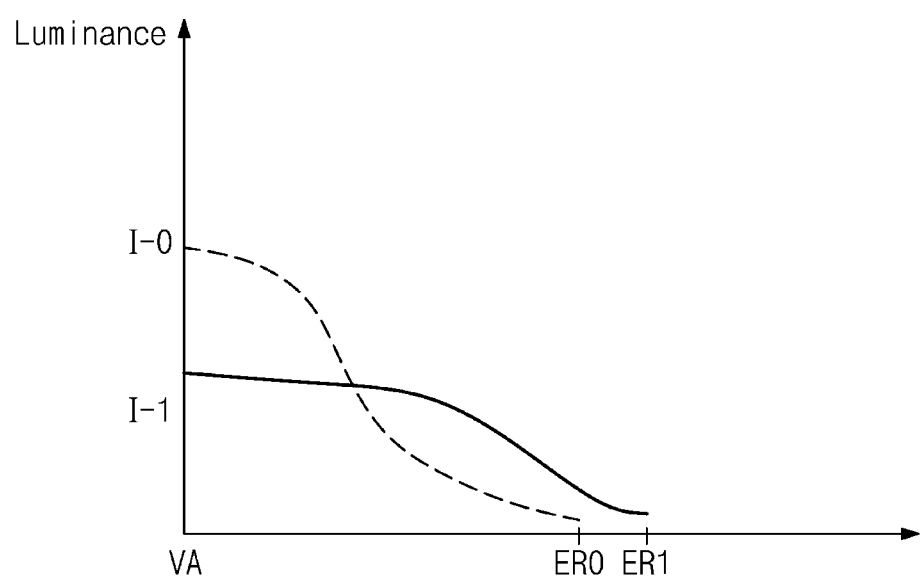
FIG. 4B is a graph illustrating luminance of light depending on a distance within an effective radius of the light emitting element.

FIG. 3A is a cross-sectional view of a portion of a filter 300-F according to an exemplary embodiment. FIGS. 3B to 3E are graphs illustrating transmittance depending on an incident angle of light incident into the filter 300-F according to an exemplary embodiment. FIG. 4A is a cross-sectional view illustrating an operation of the filter 300-F according to an exemplary embodiment. FIG. 4B is a graph illustrating luminance of light depending on a distance within an effective radius of the light emitting element. In FIGS. 3A and 3B, the barrier layers 300-B1 and 300-B2 are omitted.

According to the illustrated exemplary embodiment, the filter 300-F is directly disposed on the upper surface 300-US of the glass substrate 300-G. The filter 300-F may be formed by coating, printing, or deposition processes.

Referring to FIG. 3A, the filter 300-F includes a plurality of layers L1 and a plurality of second layers L2, which are alternatively laminated. Each of the plurality of first layers L1 may have a refractive index of about 1.8 to about 2.0 in a wavelength of 450 nm, and each of the plurality of second layers L2 may have a refractive index of about 1.4 to about 1.5 in a wavelength of 450 nm. Each of the plurality of first layers L1 may have a thickness of about 160 nm to about 200 nm, and each of the plurality of second layers L2 may have a thickness of about 60 nm to about 100 nm.

Each of the plurality of first layers L1 and the plurality of second layers L2 may include silicon oxide, silicon nitride, and silicon oxynitride, for example. Even when the plurality of first layers L1 and the plurality of second layers L2 include the same material in some exemplary embodiments, the layers may have different refractive indices depending on the deposition conditions of the thin film. In an exemplary embodiment, each of the plurality of first layers L1 may include silicon nitride, and each of the plurality of second layers L2 may include silicon oxide.

The laminated number of filter 300-F may be about 5 to about 20. FIG. 3A shows the filter 300-F according to an exemplary embodiment having a nine-layered structure including five silicon nitride layers and four silicon oxide layers. The five silicon nitride layers may have substantially the same thickness, and the four silicon oxide layers may have substantially the same thickness. The silicon nitride layer may have a thickness of about 180 nm, and the silicon oxide layer may have a thickness of about 80 nm.

The filter 300-F may vary in transmittance and reflectance depending on the incident angle of the first color light L-G. The filter 300-F has the lowest transmittance (hereinafter, referred to as "first transmittance") and has the highest reflectance (hereinafter, referred to as "first reflectance") at an incident angle of about 0 degrees (or a "first incident angle"). The filter 300-F has transmittance higher than the first transmittance and reflectance less than the first reflectance with respect to the first color light L-G having a second incident angle greater than the first incident angle. In an exemplary embodiment, the first transmittance may be about 10% to about 45%.

Transmittance of the filter 300-F to light having a wavelength of about 450 nm will be described with reference to FIGS. 3B to 3E. As illustrated in FIG. 3B, when the incident angle θ is about 0 degree, the transmittance of the filter 300-F may be about 30%. Referring to FIG. 3C, when the incident angle θ is about 20 degrees, the transmittance of the filter 300-F may be about 40%. As illustrated in FIGS. 3D and 3E, when the incident angle θ is about 40 degrees, the transmittance of the filter 300-F may be about 95% to about 98%.

As shown in FIGS. 3B to 3E, the transmittance of the filter 300-F increases as the incident angle θ of the incident first color light L-B increases. When the incident angle θ is a predetermined angle or more, the transmittance of the filter 300-F may be substantially the same.

Light that not been transmitted through the filter 300-F may not be entirely reflected, and may be partially absorbed or dissipated. However, that low transmittance generally may refer to high reflectance.

As illustrated in FIG. 4A, the first color light L-B emitted from the light emitting element 200-L and incident on the filter 300-F in a direction perpendicular (the light incident at the first inclined angle) may be mostly reflected from the filter 300-F. The reflected light may be reflected again by the upper surface 300-US of the glass substrate 300-F or the reflection sheet RS, and then be guided to be away from the vertical area VA within the effective radius EF. The guided first color light passes through the filter 300-F as the incident angle to the filter 300-F decreases. The effective radius ER may be obtained by measuring a distance at which light generated in the light emitting element 200-L reaches an area on the upper surface of the optical member 300.

Referring to FIG. 4B, the vertical area VA of the display device DD in which the filter 300-F is disposed, may have luminance "I-1" less than that "I-0" of the vertical area VA of the display device DD in which the filter 300-F is not disposed. As such, the hot spot phenomenon may be reduced. Also, an effective radius ER1 of the display device DD in which the filter 300-F is disposed may be greater than that ER0 of the display device DD in which the filter 300-F is not disposed. In this manner, a luminance variation depending on the area may be reduced.

Figure 5A:
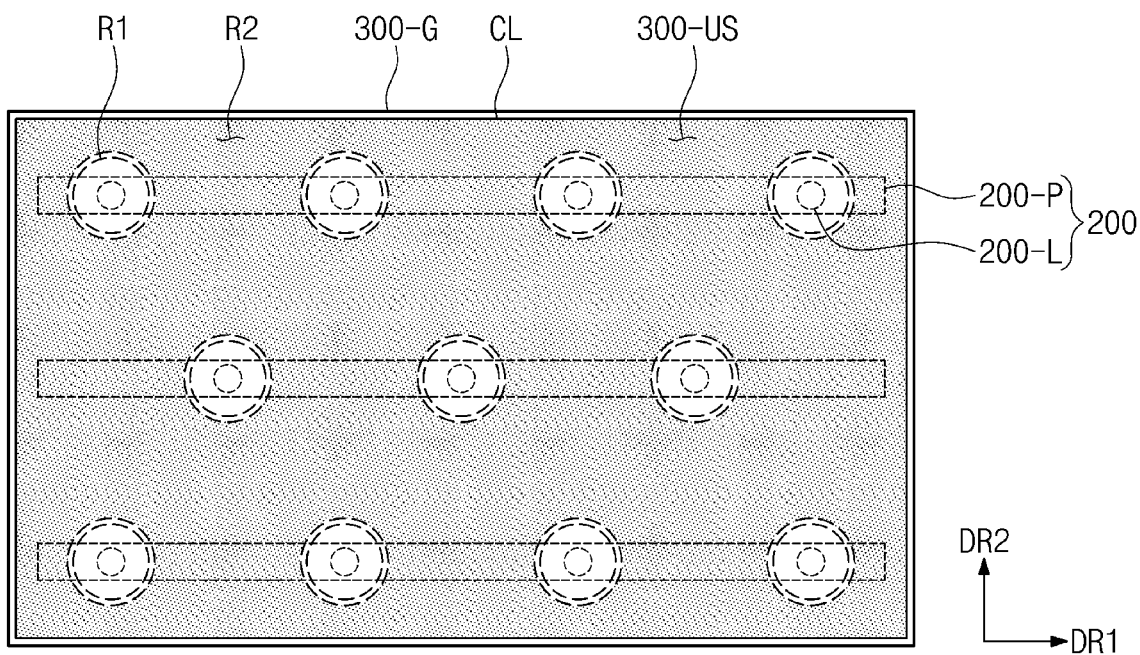
FIG. 5A is a plan view of a portion of the display device according to an exemplary embodiment.
Figure 5B:
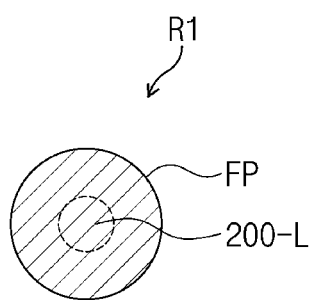
FIGS. 5B, 5C, and 5D are plan views the filter disposed in a first area according to exemplary embodiments.
Figure 5C:
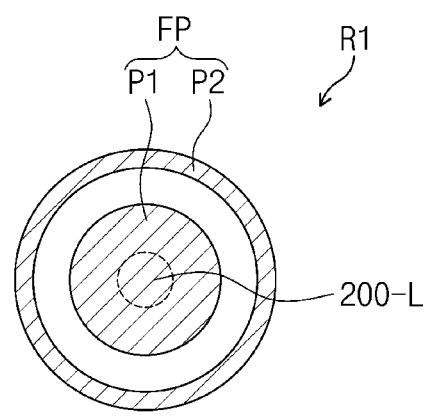
Figure 5D:
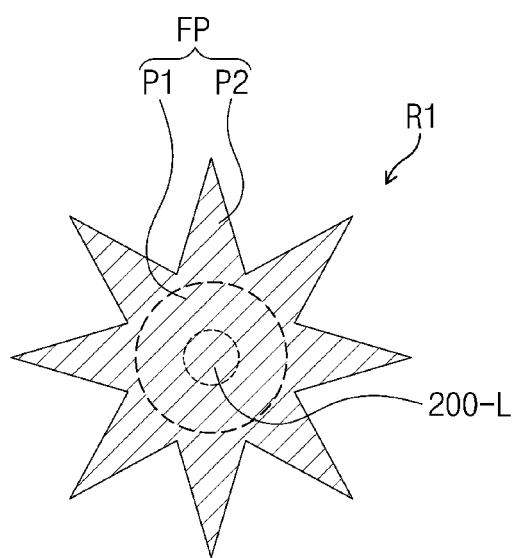
Figure 5E:
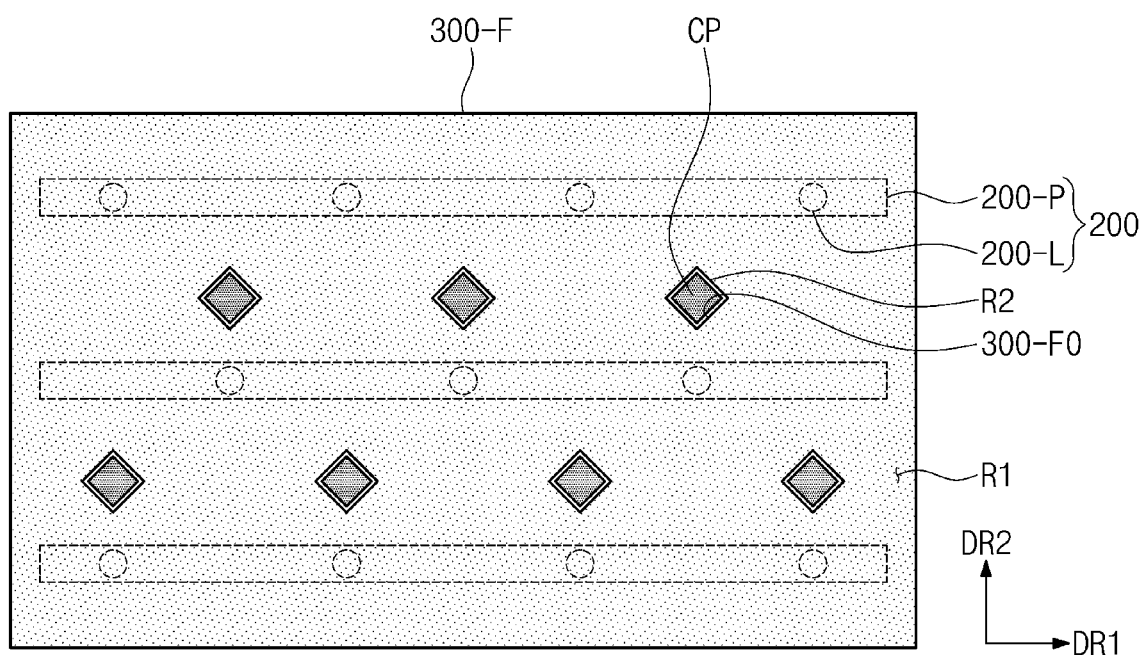
FIG. 5E is a plan view of a portion of a display device according to an exemplary embodiment.

FIG. 5A is a plan view of a portion of the display device DD according to an exemplary embodiment. FIGS. 5B to 5D are plan views of a shape of the filter disposed in a first area R1 according to exemplary embodiments. FIG. 5E is a plan view of a portion of a display device DD according to an exemplary embodiment. Hereinafter, detailed descriptions of substantially the same elements of the display device described with reference to FIGS. 1 to 4B will be omitted to avoid redundancy.

Referring to FIG. 5A, the filter 300-F may be disposed on only a portion of the area of the upper surface 300-US of the glass substrate 300-G. The filter 300-F may include a plurality of filter patterns FP. In FIG. 5A, a portion of the area of the upper surface 300-US on which the plurality of filter patterns FP are disposed may be indicated as the first area R1, and a portion of the area of the upper surface 300-US on which the plurality of filter patterns FP are not disposed may be indicated as a second area R2.

The first area R1 may include the vertical area VA described with reference to FIGS. 4A and 4B. The first area R1 may have various shapes. The filter patterns FP may be aligned with the light emitting elements 200-L so that a center of the first area R1 is aligned with a center of the vertical area VA. The filter patterns FP and the light emitting elements 200-L may correspond to each other, such as in one by one.

The filter pattern FP may be disposed to prevent the hot spot from being generated on the vertical area VA. The filter pattern FP may be in a limited area to reduce an amount of the first color light L-B that would be dissipated. In this manner, the display device may improve light efficiency.

As illustrated in FIG. 5B, the filter pattern FP may have a substantially circular shape. As illustrated in FIGS. 5C and 5D, the filter pattern FP may include a first portion P1 and a second portion P2. The first portion P1 may overlap the light emitting element 200-L. The second portion P2 may have an area less than that of the first portion P1 and may not overlap the light emitting element 200-L.

As illustrated in FIG. 5C, the first portion P1 and the second portion P2 may be spaced apart from each other. As illustrated in FIG. 5D, the second portion P2 may be provided in plural and extend from the first portion P1.

As illustrated in FIG. 5E, the filter 300-F may be disposed only on a portion of the area of the upper surface 300-US of the glass substrate 300-G. The filter 300-F may have the second area R2 in an area that does not overlap the light emitting elements 200-L. The second area R2 may be defined by openings 300-FO, for example. The filter 300-F of FIG. 5E may have the substantially same function as the filter 300-F described with reference to FIGS. 5A to 5D.

The second area R2 of the filter 300-F shown in FIGS. 5A to 5D may include a compensation layer CL, and the second area R2 of the filter 300-F of FIG. 5E may include a compensation pattern CP therein. The compensation layer CL and the compensation pattern CP may have substantially the same refractive index. For example, the difference between the refractive index of the compensation layer CL and the refractive index of the filter 300-F may be within 10% of the refractive index of the filter 300-F. The compensation layer CL and the compensation pattern CP may not overlap the filter 300-F and optically compensate the area on which the filter 300-F is not disposed. In an exemplary embodiment, the compensation layer CL and the compensation pattern CP may be omitted.

Figure 6B:
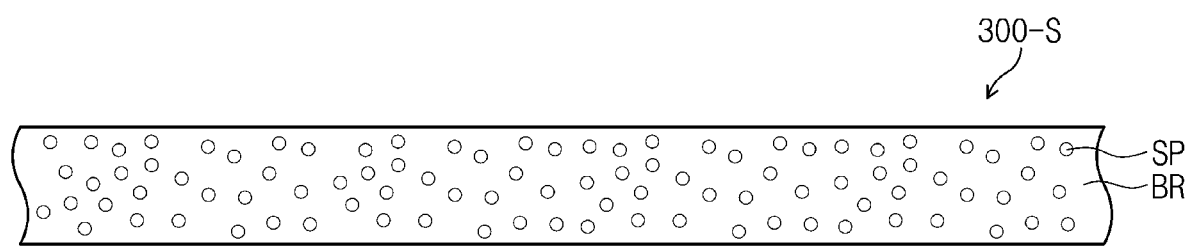
FIG. 6B is a cross-sectional view of a portion of a scattering layer according to an exemplary embodiment.
Figure 6C:
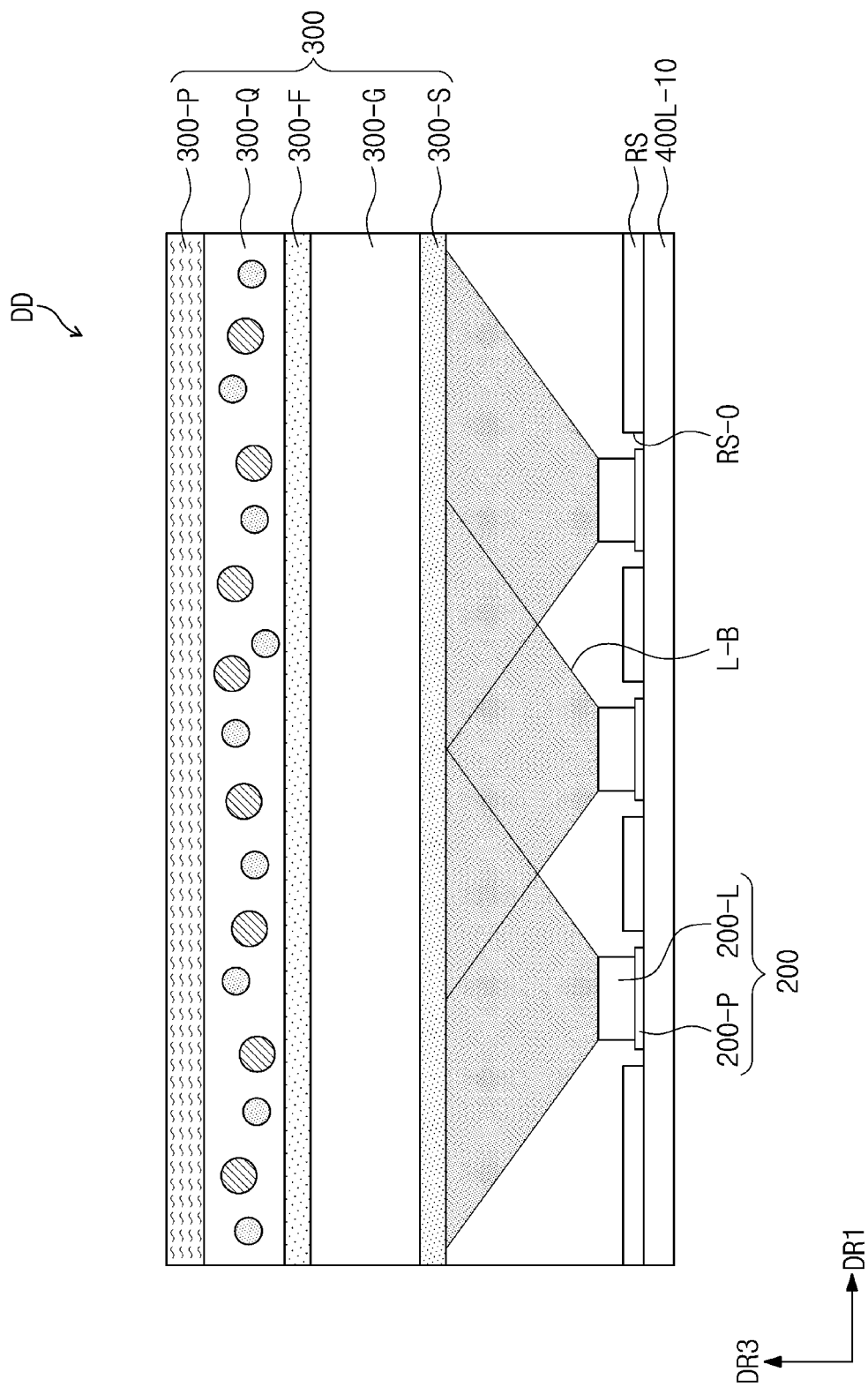
FIGS. 6C, 6D, and 6E are cross-sectional views of a portion of a display device according to exemplary embodiments.
Figure 6D:
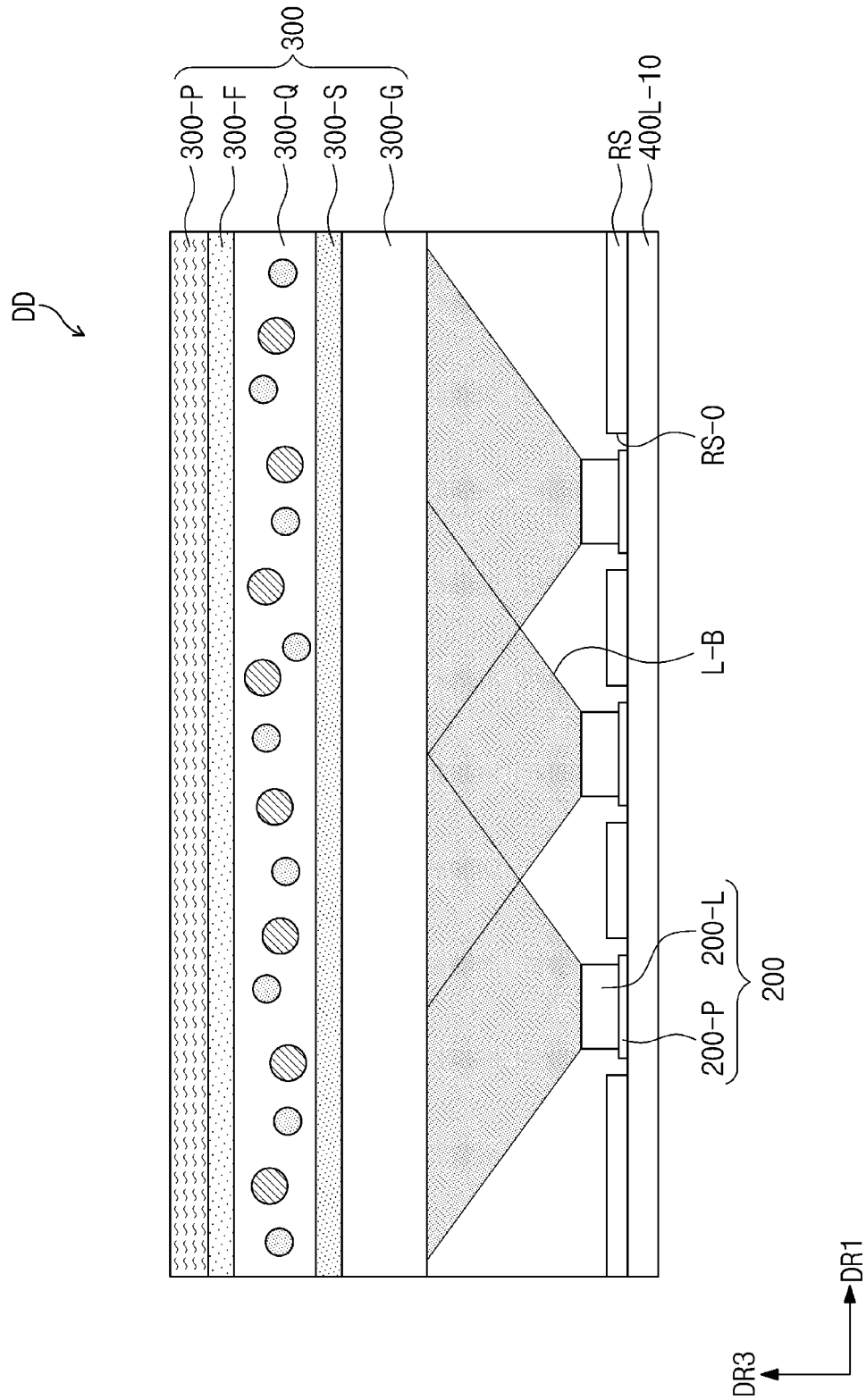
Figure 6E:
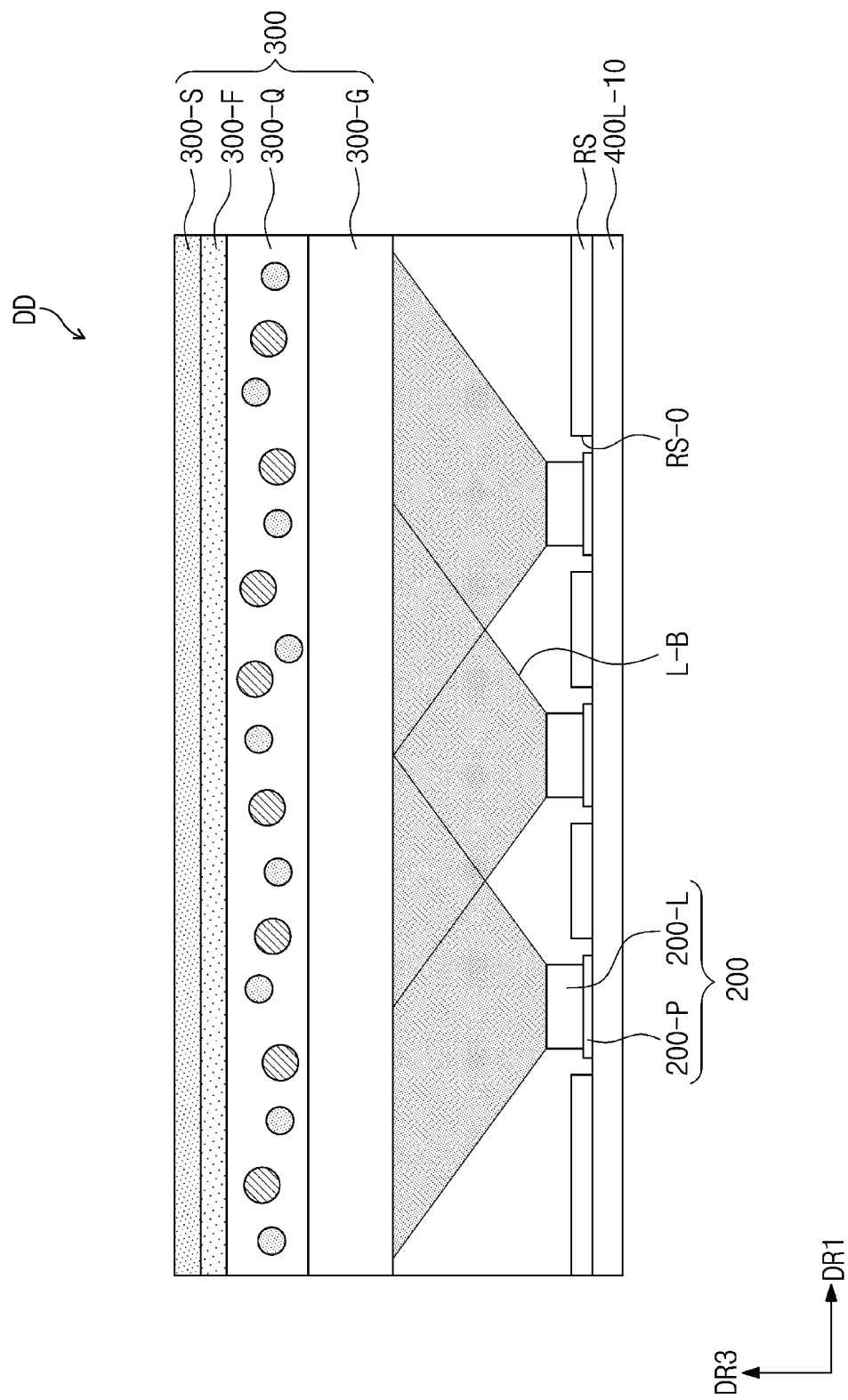

FIG. 6A is a cross-sectional view of a portion of the display device DD according to an exemplary embodiment. FIG. 6B is a cross-sectional view of a portion of a scattering layer 300-S according to an exemplary embodiment. FIGS. 6C to 6E are cross-sectional views of a portion of a display device DD according to exemplary embodiments. Hereinafter, detailed descriptions of the substantially same elements described with reference to FIGS. 1 to 5E will be omitted to avoid redundancy. In FIGS. 6A to 6E, the barrier layers 300-B1 and 300-B2 (see FIG. 2D) are omitted.

Referring to FIG. 6A, the scattering layer 300-S is directly disposed on the upper surface 300-US of the glass substrate 300-G. The scattering layer 300-S may be formed by a coating or printing process. The scattering layer 300-S may be disposed between the upper surface 300-US of the glass substrate 300_G and the quantum dot layer 300-Q. The scattering layer 300-S may scatter the first color light L-G passing through the glass substrate 300-G to prevent the occurrence of the hot spot phenomenon.

The scattering layer 300-S may include a base resin BR and scattering particles SP that are mixed (or dispersed) in the base resin BR. The base resin BR may be a medium in which the scattering particles SP are dispersed. In general, the base resin BR may include various resin compositions, such as binders.

Referring to FIG. 6B, the scattering particles SP may include one or more type of particles. The scattering particles SP may have a refractive index of about 2 or more, and a diameter of about 150 nm to about 400 nm. The scattering particles SP may include inorganic particles, such as $TiO_2$, $SiO_2$, $ZnO$, $Al_2O_3$, $BaSO_4$, $CaCO_3$, or $ZrO_2$.

Referring to FIG. 6C, the scattering layer 300-S according to an exemplary embodiment may be disposed on a lower surface 300-LS of the glass substrate 300-G. Referring to FIG. 6D, the filter 300-F according to an exemplary embodiment may be disposed above the quantum dot layer 300-Q. Referring to FIG. 6E, the filter 300-F according to an exemplary embodiment may be disposed on the quantum dot layer 300-Q, and the scattering layer 300-S may be disposed on the filter 300-F. Here, the quantum dot layer 300-Q may contact the upper surface 300-US of the glass substrate 300-G. In some exemplary embodiments, the protection layer 300-P may be omitted, and the scattering layer 300-S may have substantially the same function as the protection layer 300-P. In an exemplary embodiment, the barrier layer may be disposed on a upper surface of the quantum dot layer 300-Q.

Figure 8:
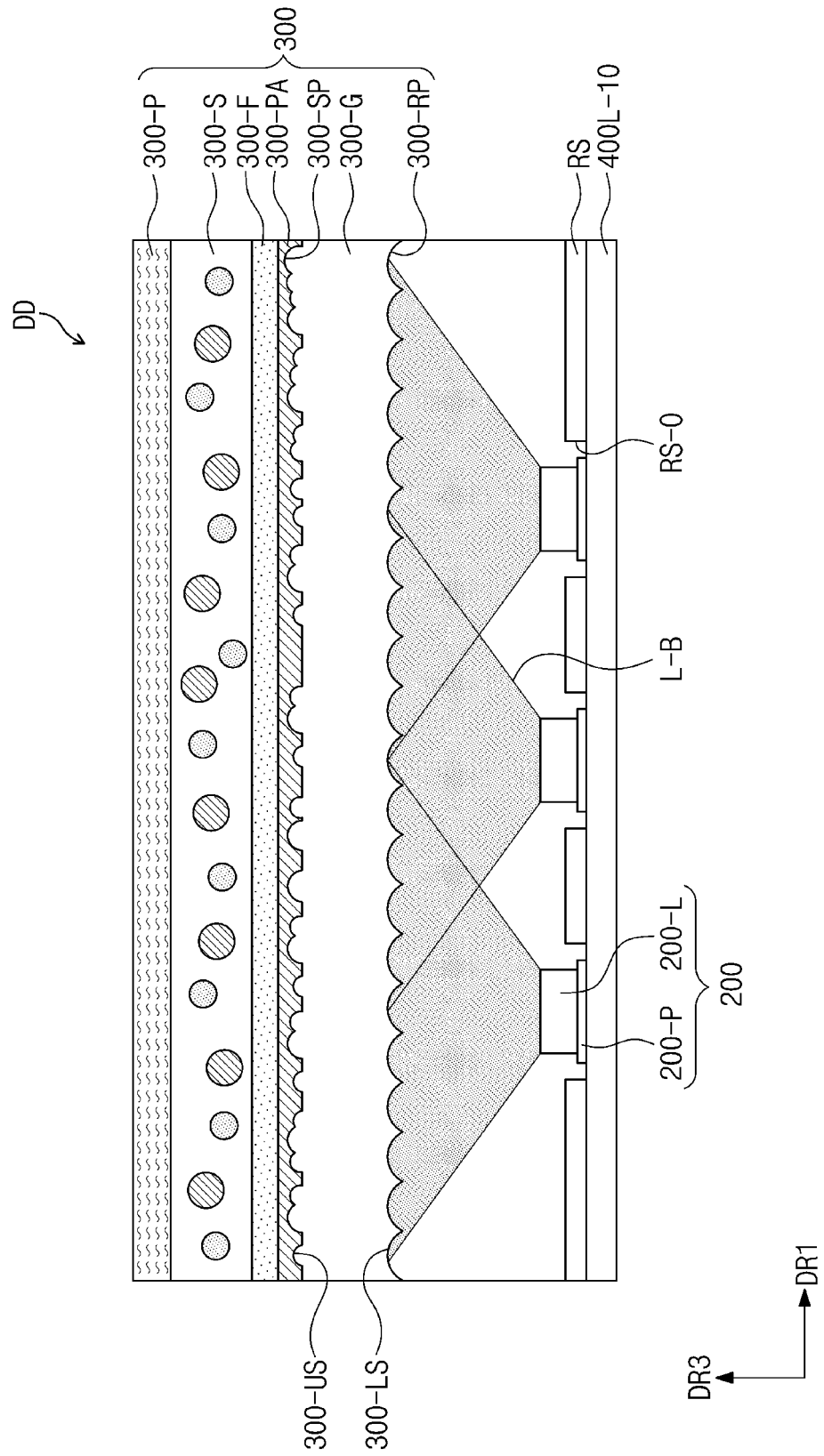
FIG. 8 is a cross-sectional view of a portion of a display device according to an exemplary embodiment.

FIG. 7 is a cross-sectional view of a portion of a display device DD according to an exemplary embodiment. FIG. 8 is a cross-sectional view of a portion of a display device DD according to an exemplary embodiment. Hereinafter, detailed descriptions of substantially the same elements described with reference to FIGS. 1 to 6C will be omitted to avoid redundancy.

Referring to FIG. 7, the display device DD may further include an insulation layer 300-I contacting the upper surface 300-US of the glass substrate 300-G and having a refractive index of about 1.3 or less. Among the first color light L-B traveling toward the vertical area VA, the one with large incident angle may be totally reflected by an interface between the glass substrate 300-G and the insulation layer 300-I. As such, a portion of the first color light L-B traveling to the vertical area VA is guided in a direction away from the vertical area VA in a plan view. In this manner, the hot spot phenomenon may be prevented.

Referring to FIG. 8, the lower surface 300-LS of the glass substrate 300-G according to an exemplary embodiment may have concave lens patterns 300-RP formed thereon. The lens patterns 300-RP may diffuse the first color light L-B received from the light emitting units 200. The lens patterns 300-RP may be formed by an etching or imprint process.

As illustrated in FIG. 8, the upper surface 300-US of the glass substrate 300-G may have convex scattering patterns 300-SP formed thereon. The scattering patterns 300-SP may be irregularly arranged. The scattering patterns 300-SP may scatter the first color light received from the light emitting units 200. The scattering patterns 300-SP may be formed by an etching process.

A passivation layer 300-PA contacting the scattering patterns 300-SP and providing a planarization surface may be disposed on the upper surface 300-US of the glass substrate 300-G. The passivation layer 300-PA may include an organic material and be formed by a coating process.

As described above, the optical member according to an exemplary embodiment may guide the first color light to a peripheral area of the first area to prevent light concentration in the first area overlapping the light emitting units in a plan view. In this manner, the hot spot phenomenon may be prevented.

The glass substrate may support the functional layers of the optical member. Since the glass substrate has less thermal deformation, even though the optical distance between the light emitting elements and the glass substrate is short, the defects may not occur.

Since the direct-type light emitting units provide white light to the display panel by using the quantum dot layer, the display panel may provide the high luminance image.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
an optical member;
a display panel disposed above the optical member; and
a plurality of light emitting units disposed below the optical member and configured to provide first color light to the optical member,
wherein the optical member comprises:
a support substrate having upper surface and lower surface facing each other in a thickness direction and overlapping the light emitting units;
a quantum dot layer directly disposed on the upper surface or the lower surface and configured to convert the first color light into second color light and third color light; and
a filter directly disposed on at least one of the upper surface and the lower surface of the support substrate, and having a first transmittance to the first color light having a first incident angle of 0 degrees and having a second transmittance greater than the first transmittance to the first color light having a second incident angle greater than the first incident angle, the filter overlaps a portion of the upper surface and the lower surface of the support substrate, and
wherein the filter comprises a plurality of filter patterns spaced apart from each other, each of the filter patterns corresponding to a corresponding one of the light emitting elements in a plan view.

2. The display device of claim 1, wherein the first transmittance is about 10% to about 45%.

3. The display device of claim 1, wherein a value of the first transmittance to the first color light having the first incident angle is less than a value of reflectance to the first color light having the first incident angle.

4. The display device of claim 1, wherein the first color light has a wavelength of about 410 nm to about 480 nm.

5. The display device of claim 1, wherein:
the filter comprises a plurality of first layers and a plurality of second layers alternatively disposed with each other;
each of the first layers has a refractive index of about 1.8 to about 2.0 in a wavelength of 450 nm and has a thickness of about 160 nm to about 200 nm; and
each of the second layers has a refractive index of about 1.4 to about 1.5 in a wavelength of 450 nm and has a thickness of about 60 nm to about 100 nm.

6. The display device of claim 5, wherein each of the first layers comprises silicon nitride, and each of the second layers comprises silicon oxide.

7. The display device of claim 5, wherein a laminated number of the first layers and the second layers is about 5 to about 20.

8. The display device of claim 1, wherein each of the light emitting units comprises a circuit board having a substantially elongated shape and a plurality of light emitting elements mounted on the circuit board.

9. The display device of claim 8, further comprising a reflection sheet disposed on the circuit board, the reflection sheet having a plurality of openings that correspond to the light emitting elements,
wherein the reflection sheet has a blue color.

10. The display device of claim 1, wherein each of the filter patterns comprises:
   a first portion overlapping the corresponding one of the light emitting elements; and
   a second portion having an area less than that of the first portion and does not overlap the corresponding one of the light emitting elements.

11. The display device of claim 1, further comprising a compensation layer disposed adjacent to the filter patterns, the compensation layer not overlapping the filter patterns.

12. A display device comprising:
   an optical member;
   a display panel disposed above the optical member; and
   a plurality of light emitting units disposed below the optical member and configured to provide first color light to the optical member,
   wherein the optical member comprises:
      a support substrate having upper surface and lower surface facing each other in a thickness direction and overlapping the light emitting units;
      a quantum dot layer directly disposed on the upper surface or the lower surface and configured to convert the first color light into second color light and third color light and;
      a filter directly disposed on at least one of the upper surface and lower surface of the support substrate, and having a first transmittance to the first color light having a first incident angle of 0 degrees and having a second transmittance greater than the first transmittance to the first color light having a second incident angle greater than the first incident angle,
   wherein the filter overlaps a portion of each of the upper surface and the lower surface of the support substrate, and
   wherein the filter comprises openings in areas that do not overlap the light emitting elements.

13. The display device of claim 12, further comprising a compensation pattern filled in the openings.

14. The display device of claim 1, further comprising a scattering layer directly disposed on at least one of the upper surface and the lower surface of the support substrate, the scattering layer comprising a base resin layer and scattering particles mixed with the base resin layer.

15. The display device of claim 14, wherein each of the scattering particles comprises at least one of $TiO_2$, $SiO_2$, $ZnO$, $Al_2O_3$, $BaSO_4$, $CaCO_3$, and $ZrO_2$.

16. The display device of claim 14, wherein the scattering particles have a refractive index of at least 2 and a diameter of about 150 nm to about 400 nm.

17. The display device of claim 1, further comprising an insulation layer contacting the upper surface of the support substrate and having a refractive index of about 1.3 or less.

18. The display device of claim 1, wherein the lower surface of the support substrate includes concave lens patterns.

19. The display device of claim 1, wherein the upper surface of the support substrate includes convex scattering patterns.

20. The display device of claim 19, further comprising a passivation layer contacting the convex scattering patterns of the support substrate and providing a planarization surface.

21. The display device of claim 1, further comprising a barrier layer contacting at least one of upper surface and lower surface of the quantum dot layer, and comprising an inorganic material.

22. The display device of claim 1, wherein the support substrate is a glass substrate.

23. A display device comprising:
   an optical member;
   a display panel disposed above the optical member;
   a plurality of light emitting units disposed below the optical member and configured to provide blue light to the optical member; and
   a protection member accommodating the light emitting units, the optical member, and the display panel,
   wherein the optical member comprises:
      a glass substrate having an upper surface and a lower surface facing each other in a thickness direction and overlapping the light emitting units;
      a quantum dot layer directly disposed on the upper surface or the lower surface and configured to convert the blue color light into green light and red light; and
      a filter directly disposed on at least one of the upper surface and the lower surface of the glass substrate,
   wherein the filter comprises a plurality of first layers and a plurality of second layers alternatively disposed with the plurality of first layers, and
   wherein each of the first layers has a refractive index of about 1.8 to about 2.0 in a wavelength of 450 nm and has a thickness of about 160 nm to about 200 nm, and each of the second layers has a refractive index of about 1.4 to about 1.5 in the wavelength of 450 nm and has a thickness of about 60 nm to about 100 nm.

* * * * *